US010792908B2

(12) United States Patent
Batchelder et al.

(10) Patent No.: US 10,792,908 B2
(45) Date of Patent: Oct. 6, 2020

(54) SYSTEMS AND METHODS FOR ELECTROPHOTOGRAPHY-BASED ADDITIVE MANUFACTURING OF PARTS

(71) Applicant: Evolve Additive Solutions, Inc., Minnetonka, MN (US)

(72) Inventors: J. Samuel Batchelder, Somers, NY (US); Arun Chowdry, Maple Grove, MN (US); Steven A. Chillscyzn, Victoria, MN (US)

(73) Assignee: Evolve Additive Solutions, Inc., Minnetonka, MN (US)

( * ) Notice: Subject to any disclaimer, the term of this patent is extended or adjusted under 35 U.S.C. 154(b) by 395 days.

(21) Appl. No.: 15/386,904

(22) Filed: Dec. 21, 2016

(65) Prior Publication Data

US 2017/0192377 A1    Jul. 6, 2017

Related U.S. Application Data

(60) Provisional application No. 62/273,882, filed on Dec. 31, 2015.

(51) Int. Cl.
*B29C 64/40* (2017.01)
*B33Y 30/00* (2015.01)
(Continued)

(52) U.S. Cl.
CPC ............ *B33Y 30/00* (2014.12); *B29C 64/141* (2017.08); *B29C 64/40* (2017.08); *B33Y 10/00* (2014.12);
(Continued)

(58) Field of Classification Search
CPC ....... B33Y 30/00; B33Y 10/00; B29C 64/141; B29C 64/40; B29C 64/232; B29C 64/227;
(Continued)

(56) References Cited

U.S. PATENT DOCUMENTS 6,047,151 A * 4/2000 Carvalho ............. G03G 15/107
34/469
8,123,999 B2    2/2012 Priedeman, Jr. et al.
(Continued)

OTHER PUBLICATIONS

"ABS Processing Guide," Fast Heat, Apr. 1, 2012, accessed at fastheatuk.com on Mar. 25, 2019. (Year: 2012).*

*Primary Examiner* — Joseph S Del Sole
*Assistant Examiner* — Jamel M Nelson
(74) *Attorney, Agent, or Firm* — Pauly, DeVries, Smith & Deffner LLC

(57) ABSTRACT

In a method of producing a 3D part using an electrophotography-based additive manufacturing system, a plurality of layers of a powder-based material are developed using at least one electrophotography (EP) engine. The developed layers are transferred to a transfer medium. The layers on the transfer medium are dried by heating the layers without fully fusing the powder-based material to itself using a dryer. This reduces a water content of the layers. The dried layers are heated on the transfer medium to at least a fusion temperature, at which the power-based material fuses together, using a pre-transfusion heater. The dried layers are then transfused together on a build platform using a transfusion assembly to build the part in a layer-by-layer manner.

12 Claims, 4 Drawing Sheets

(51) Int. Cl.
*G03G 15/22* (2006.01)
*B29C 64/141* (2017.01)
*G03G 15/20* (2006.01)
*B33Y 10/00* (2015.01)
*G03G 15/16* (2006.01)
*G03G 15/24* (2006.01)

(52) U.S. Cl.
CPC ..... *G03G 15/1625* (2013.01); *G03G 15/2003* (2013.01); *G03G 15/224* (2013.01); *G03G 15/24* (2013.01); *G03G 2215/1695* (2013.01)

(58) Field of Classification Search
CPC ..... B29C 64/245; B29C 64/25; B29C 64/255; G03G 15/1625; G03G 15/2003; G03G 15/224; G03G 15/24; G03G 2215/1695
See application file for complete search history.

(56) References Cited

U.S. PATENT DOCUMENTS

| | | | |
|---|---|---|---|
| 8,246,888 B2 * | 8/2012 | Hopkins | C08L 25/08 |
| | | | 156/155 |
| 8,459,280 B2 | 6/2013 | Swanson et al. | |
| 2008/0169585 A1 | 7/2008 | Zinniel | |
| 2011/0186081 A1 | 8/2011 | Dunn et al. | |
| 2013/0077996 A1 | 3/2013 | Hanson et al. | |
| 2013/0077997 A1 | 3/2013 | Hanson et al. | |
| 2013/0186549 A1 | 7/2013 | Comb et al. | |
| 2013/0186558 A1 * | 7/2013 | Comb | G03G 15/169 |
| | | | 156/277 |

* cited by examiner

SYSTEMS AND METHODS FOR ELECTROPHOTOGRAPHY-BASED ADDITIVE MANUFACTURING OF PARTS

CROSS REFERENCE TO RELATED APPLICATION(S)

The present application claims the benefit of U.S. Provisional Patent Application Ser. No. 62/273,882 entitled SYSTEMS AND METHODS FOR ELECTROPHOTOGRAPHY-BASED ADDITIVE MANUFACTURING OF PARTS which was filed on Dec. 31, 2015, the contents of which are incorporated by reference in its entirety.

BACKGROUND

The present disclosure relates to additive manufacturing systems for producing three-dimensional (3D) parts and support structures. In particular, the present disclosure relates to electrophotography-based additive manufacturing systems for producing 3D parts, and methods of producing 3D parts using the systems.

Additive manufacturing systems are used to build 3D parts from digital representations of the 3D parts (e.g., AMF and STL format files) using one or more additive manufacturing techniques. Examples of additive manufacturing techniques include extrusion-based techniques, ink jetting, selective laser sintering, powder/binder jetting, electron-beam melting, stereolithographic, and electrophotographic processes. For each of these techniques, the digital representation of the 3D part is initially sliced into multiple horizontal layers. For each sliced layer, a tool path is then generated, which provides instructions for the particular additive manufacturing system to form the given layer.

In an electrophotographic 3D printing or production process, each slice of the digital representation of the 3D part is printed or developed using an electrophotographic engine. The electrophotographic engine generally operates in accordance with 2D electrophotographic printing processes, but with a polymeric toner. The electrophotographic engine typically uses a conductive support drum that is coated with a photoconductive material layer, where latent electrostatic images are formed by electrostatic charging, followed by image-wise exposure of the photoconductive layer by an optical source. The latent electrostatic images are then moved to a developing station where the polymeric toner is applied to charged areas, or alternatively to discharged areas of the photoconductive insulator to form the layer of the polymeric toner representing a slice of the 3D part. The developed layer is transferred to a transfer medium, from which the layer is transfused to previously printed layers with heat and/or pressure to build the 3D part.

SUMMARY

Aspects of the present disclosure are directed to electrophotography-based additive manufacturing systems for producing 3D parts, and methods of producing 3D parts using the systems. In one embodiment of the method, a plurality of layers of a powder-based material are developed using at least one electrophotography (EP) engine. The developed layers are transferred to a transfer medium. The layers on the transfer medium are dried by heating the layers without fully fusing the powder-based material to itself using a dryer. This reduces a water content of the layers. The dried layers are heated on the transfer medium to at least a fusion temperature, at which the power-based material fuses together, using a pre-transfusion heater. The dried layers are then transfused together on a build platform using a transfusion assembly to build the part in a layer-by-layer manner.

One embodiment of the electrophotography-based additive manufacturing system includes a transfer assembly, at least one EP engine, a dryer, a pre-transfusion heater, and a transfusion assembly. The transfer assembly includes a transfer medium, and a drive mechanism configured to feed the transfer medium in a feed direction. The at least one EP engine is configured to develop layers of a powder-based material and transfer the layers to the transfer medium. The dryer is positioned downstream of the at least one EP engine relative to the feed direction, and is configured to heat the layers on the transfer medium to reduce a water content of the layers without fully fusing the powder-based part material. The pre-transfusion heater is positioned downstream of the dryer relative to the feed direction, the pre-transfusion heater configured to heat the layers on the transfer medium to at least a fusion temperature, at which the power-based material fuses together The transfusion assembly is positioned downstream of the dryer and the pre-transfusion heater relative to the feed direction and is configured to transfuse the layers to each other on a build platform in a layer-by-layer manner to build the part.

Definitions

Unless otherwise specified, the following terms as used herein have the meanings provided below:

The term "copolymer" refers to a polymer having two or more monomer species, and includes terpolymers (i.e., copolymers having three monomer species).

The terms "at least one" and "one or more of" an element are used interchangeably, and have the same meaning that includes a single element and a plurality of the elements, and may also be represented by the suffix "(s)" at the end of the element. For example, "at least one polyimide", "one or more polyamides", and "polyamide(s)" may be used interchangeably and have the same meaning.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

Directional orientations such as "above", "below", "top", "bottom", and the like are made with reference to a direction along a printing axis of a 3D part. In the embodiments in which the printing axis is a vertical z-axis, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, the terms "above", "below", "top", "bottom", and the like are relative to the given axis.

The term "providing", such as for "providing a material" and the like, when recited in the claims, is not intended to require any particular delivery or receipt of the provided item. Rather, the term "providing" is merely used to recite items that will be referred to in subsequent elements of the claim(s), for purposes of clarity and ease of readability.

Unless otherwise specified, temperatures referred to herein are based on atmospheric pressure (i.e. one atmosphere).

The terms "about" and "substantially" are used herein with respect to measurable values and ranges due to expected variations known to those skilled in the art (e.g., limitations and variabilities in measurements).

All references cited herein are incorporated by reference in their entireties.

DETAILED DESCRIPTION

Figure 1:
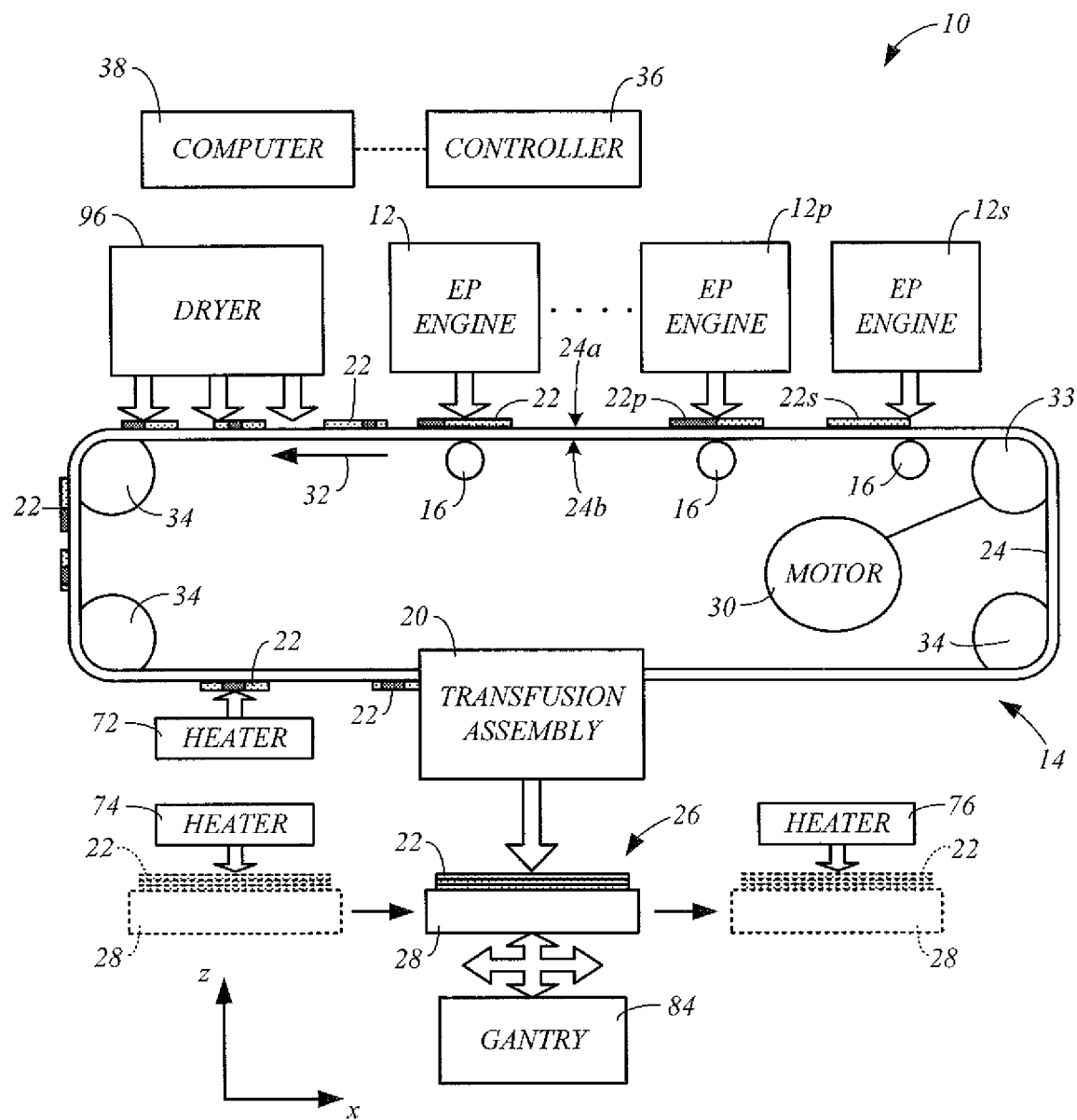
FIG. 1 is a simplified diagram of an exemplary electrophotography-based additive manufacturing system for printing 3D parts and associated support structures, in accordance with embodiments of the present disclosure.

The present disclosure is directed to electrophotography-based additive manufacturing systems for printing 3D parts, and methods of printing 3D parts using the systems. As mentioned above, during a electrophotographic 3D part additive manufacturing or printing operation, an electrophotography (EP) engine may develop each layer of the 3D part (and any associated support material) out of a polymeric toner or powder-based material using the electrophotographic process. The developed layers are then transferred to a transfer medium, which delivers the layers to a transfusion assembly where the layers are transfused (e.g., using heat and/or pressure) to build a 3D part and support structures in a layer-by-layer manner.

This electrophotographic 3D part manufacturing or printing process, as with electrophotographic 2D image printing processes, generally requires ambient air relative humidity levels of between about 20% and about 80% near 25° C. It has been determined that the modest ionic conductivity provided by a non-zero humidity level is important in the charging, flowing, development, and transfer of the charged powder-based material or toner. A relative humidity target of about 20% at 25° C. is a reasonably optimal temperature and humidity level for typical electrophotographic processes.

The powder-based material (e.g., polymeric or thermoplastic toner) used in electrophotographic 3D part printing processes is typically derived from one or more engineering-grade thermoplastic materials, such as Acrylonitrile-Butadiene-Styrene (ABS). ABS and similar materials will generally absorb on the order of 0.5% water by weight, when subject to ambient humidity levels of 20% or more. While this level of water content in the powder-based material is useful in performing the electrophotographic print of the layer of the part and/or part support structure, the moisture in the powder-based material can adversely affect the transfusion of the layer to other layers, and the formation of the 3D part.

For example, absorbed water in an electrophotographically printed layer of the powder-based material will cause the material to swell as the water escapes the material during the transfusion of the layer to other layers of the part, such as when the layer is heated to 180° C. or more. This results in the formation of gas pockets within the transfused part or support layers, and the transfused part or support layers can become significantly strained as if in tension normal to the build surface.

Thus, while it is desirable for the powder-based material to contain water for the electrophotographic printing process, it is desirable for the powder-based material to be very dry during the transfusion of the printed layers. Embodiments of the present disclosure provide solutions to this and other issues. In some embodiments, a dryer is used to dry the developed layers on the transfer medium before the transfusion process begins. The dryer operates to reduce the water content in the layers to less than 0.1% water by weight, for example, and typically less than 0.07% water by weight. Pre-transfusion heating of the layers can further reduce the water content of the layers to 0.02% water by weight, for example, before the layers are transfused to other layers during the building of the 3D part.

FIG. 1 is a simplified diagram of an exemplary electrophotography-based additive manufacturing system 10 for printing 3D parts and associated support structures, in accordance with embodiments of the present disclosure. As shown in FIG. 1, system 10 includes one or more EP engines, generally referred to as 12, such as EP engines 12p and 12s, a transfer assembly 14, biasing mechanisms 16, and a transfusion assembly 20. Examples of suitable components and functional operations for system 10 include those disclosed in Hanson et al., U.S. Publication Nos. 2013/0077996 and 2013/0077997, and in Comb et al., U.S. Patent Publication Nos. 2013/0186549 and 2013/0186558.

The EP engines 12p and 12s are imaging engines for respectively imaging or otherwise developing layers, generally referred to as 22, of the powder-based part and support materials, where the part and support materials are each preferably engineered for use with the particular architecture of the EP engine 12p or 12s. As discussed below, the developed layers 22 are transferred to a transfer medium 24 of the transfer assembly 14, which delivers the layers 22 to the transfusion assembly 20. The transfusion assembly 20 operates to build the 3D part 26, which may include support structures and other features, in a layer-by-layer manner by transfusing the layers 22 together on a build platform 28.

In some embodiments, the transfer medium 24 includes a belt, as shown in FIG. 1. Examples of suitable transfer belts for the transfer medium 24 include those disclosed in Comb et al., U.S. Patent Application Nos. 2013/0186549 and 2013/0186558. In some embodiments, the belt 24 includes front surface 24a and rear surface 24b, where front surface 24a faces the EP engines 12, and the rear surface 24b is in contact with the biasing mechanisms 16.

In some embodiments, the transfer assembly 14 includes one or more drive mechanisms that include, for example, a motor 30 and a drive roller 33, or other suitable drive mechanism, and operate to drive the transfer medium or belt 24 in a feed direction 32. In some embodiments, the transfer assembly 14 includes idler rollers 34 that provide support for the belt 24. The exemplary transfer assembly 14 illustrated in FIG. 1 is highly simplified and may take on other configurations. Additionally, the transfer assembly 14 may include additional components that are not shown in order to simplify the illustration, such as, for example, components for maintaining a desired tension in the belt 24, a belt cleaner for removing debris from the surface 24a that receives the layers 22, and other components.

The EP engine 12s develops layers of powder-based support material, and the EP engine 12p develops layers of powder-based part material. In some embodiments, the EP engine 12s is positioned upstream from the EP engine 12p relative to the feed direction 32, as shown in FIG. 1. In alternative embodiments, the arrangement of the EP engines 12p and 12s may be reversed such that the EP engine 12p is upstream from the EP engine 12s relative to the feed direction 32. In further alternative embodiments, system 10 may include three or more EP engines 12 for printing layers of additional materials, as indicated in FIG. 1.

System 10 also includes controller 36, which represents one or more processors that are configured to execute instructions, which may be stored locally in memory of the system 10 or in memory that is remote to the system 10, to control components of the system 10 to perform one or more functions described herein. In some embodiments, the controller 36 includes one or more control circuits, microprocessor-based engine control systems, and/or digitally-controlled raster imaging processor systems, and is configured to operate the components of system 10 in a synchronized manner based on printing instructions received from a host computer 38 or a remote location. In some embodiments, the host computer 38 includes one or more computer-based systems that are configured to communicate with controller 36 to provide the print instructions (and other operating information). For example, the host computer 38 may transfer information to the controller 36 that relates to the sliced layers of the 3D parts and support structures, thereby allowing the system 10 to print the 3D parts 26 and support structures in a layer-by-layer manner.

The components of system 10 may be retained by one or more frame structures. Additionally, the components of system 10 may be retained within an enclosable housing that prevents components of the system 10 from being exposed to ambient light during operation.

Figure 2:
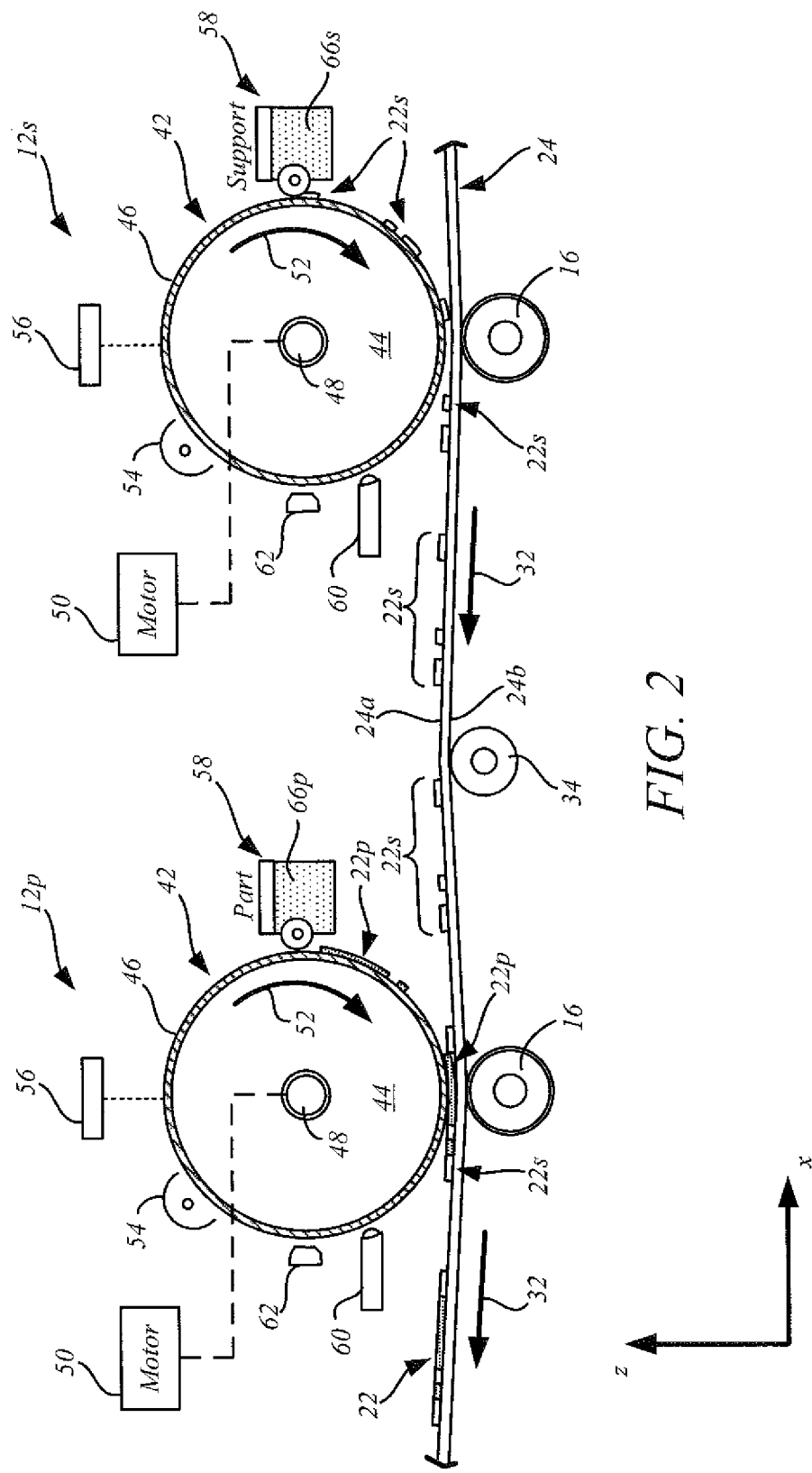
FIG. 2 is a schematic front view of a pair of exemplary electrophotography engines of the system for developing layers of the part and support materials.

FIG. 2 is a schematic front view of the EP engines 12s and 12p of the system 10, in accordance with exemplary embodiments of the present disclosure. In the shown embodiment, the EP engines 12p and 12s may include the same components, such as a photoconductor drum 42 having a conductive drum body 44 and a photoconductive surface 46. The conductive drum body 44 is an electrically-conductive drum (e.g., fabricated from copper, aluminum, tin, or the like) that is electrically grounded and configured to rotate around a shaft 48. The shaft 48 is correspondingly connected to a drive motor 50, which is configured to rotate the shaft 48 (and the photoconductor drum 42) in the direction of arrow 52 at a constant rate.

The photoconductive surface 46 is a thin film extending around the circumferential surface of the conductive drum body 44, and is preferably derived from one or more photoconductive materials, such as amorphous silicon, selenium, zinc oxide, organic materials, and the like. As discussed below, the surface 46 is configured to receive latent-charged images of the sliced layers of a 3D part or support structure (or negative images), and to attract charged particles of the part or support material to the charged or discharged image areas, thereby creating the layers of the 3D part or support structure.

As further shown, each of the exemplary EP engines 12p and 12s also includes a charge inducer 54, an imager 56, a development station 58, a cleaning station 60, and a discharge device 62, each of which may be in signal communication with the controller 36. The charge inducer 54, the imager 56, the development station 58, the cleaning station 60, and the discharge device 62 accordingly define an image-forming assembly for the surface 46 while the drive motor 50 and the shaft 48 rotate the photoconductor drum 42 in the direction 52.

The EP engines 12 use the powder-based material (e.g., polymeric or thermoplastic toner), generally referred to herein as 66, to develop or form the layers 22. In some embodiments, the image-forming assembly for the surface 46 of the EP engine 12s is used to form support layers 22s of the powder-based support material 66s, where a supply of the support material 66s may be retained by the development station 58 (of the EP engine 12s) along with carrier particles. Similarly, the image-forming assembly for the surface 46 of the EP engine 12p is used to form part layers 22p of the powder-based part material 66p, where a supply of the part material 66p may be retained by the development station 58 (of the EP engine 12p) along with carrier particles.

The charge inducer 54 is configured to generate a uniform electrostatic charge on the surface 46 as the surface 46 rotates in the direction 52 past the charge inducer 54. Suitable devices for the charge inducer 54 include corotrons, scorotrons, charging rollers, and other electrostatic charging devices.

The imager 56 is a digitally-controlled, pixel-wise light exposure apparatus configured to selectively emit electromagnetic radiation toward the uniform electrostatic charge on the surface 46 as the surface 46 rotates in the direction 52 the past imager 56. The selective exposure of the electromagnetic radiation to the surface 46 is directed by the controller 36, and causes discrete pixel-wise locations of the electrostatic charge to be removed (i.e., discharged to ground), thereby forming latent image charge patterns on the surface 46.

Suitable devices for the imager 56 include scanning laser (e.g., gas or solid state lasers) light sources, light emitting diode (LED) array exposure devices, and other exposure device conventionally used in 2D electrophotography systems. In alternative embodiments, suitable devices for the charge inducer 54 and the imager 56 include ion-deposition systems configured to selectively directly deposit charged ions or electrons to the surface 46 to form the latent image charge pattern. As such, as used herein, the term "electrophotography" includes ionography.

Each development station 58 is an electrostatic and magnetic development station or cartridge that retains the supply of the part material 66p or the support material 66s, along with carrier particles. The development stations 58 may function in a similar manner to single or dual component development systems and toner cartridges used in 2D electrophotography systems. For example, each development station 58 may include an enclosure for retaining the part material 66p or the support material 66s and carrier particles. When agitated, the carrier particles generate triboelectric charges to attract the powders of the part material 66p or the support material 66s, which charges the attracted powders to a desired sign and magnitude, as discussed below.

Each development station 58 may also include one or more devices for transferring the charged part or the support material 66p or 66s to the surface 46, such as conveyors, fur brushes, paddle wheels, rollers, and/or magnetic brushes. For instance, as the surface 46 (containing the latent charged image) rotates from the imager 56 to the development station 58 in the direction 52, the charged part material 66p or the support material 66s is attracted to the appropriately charged regions of the latent image on the surface 46, utilizing either charged area development or discharged area development (depending on the electrophotography mode being utilized). This creates successive layers 22p or 22s as the photoconductor drum 12 continues to rotate in the direction 52, where the successive layers 22p or 22s correspond to the successive sliced layers of the digital representation of the 3D part or support structure.

The successive layers 22p or 22s are then rotated with the surface 46 in the direction 52 to a transfer region in which layers 22p or 22s are successively transferred from the photoconductor drum 42 to the belt 24 or other transfer medium, as discussed below. While illustrated as a direct engagement between the photoconductor drum 42 and the belt 24, in some preferred embodiments, the EP engines 12p and 12s may also include intermediary transfer drums and/or belts, as discussed further below.

After a given layer 22p or 22s is transferred from the photoconductor drum 42 to the belt 24 (or an intermediary transfer drum or belt), the drive motor 50 and the shaft 48 continue to rotate the photoconductor drum 42 in the direction 52 such that the region of the surface 46 that previously held the layer 22p or 22s passes the cleaning station 60. The cleaning station 60 is a station configured to remove any residual, non-transferred portions of part or support material 66p or 66s. Suitable devices for the cleaning station 60 include blade cleaners, brush cleaners, electrostatic cleaners, vacuum-based cleaners, and combinations thereof.

After passing the cleaning station 60, the surface 46 continues to rotate in the direction 52 such that the cleaned regions of the surface 46 pass the discharge device 62 to remove any residual electrostatic charge on the surface 46, prior to starting the next cycle. Suitable devices for the discharge device 62 include optical systems, high-voltage alternating-current corotrons and/or scorotrons, one or more rotating dielectric rollers having conductive cores with applied high-voltage alternating-current, and combinations thereof.

The biasing mechanisms 16 are configured to induce electrical potentials through the belt 24 to electrostatically attract the layers 22p and 22s from the EP engines 12p and 12s to the belt 24. Because the layers 22p and 22s are each only a single layer increment in thickness at this point in the process, electrostatic attraction is suitable for transferring the layers 22p and 22s from the EP engines 12p and 12s to the belt 24.

The controller 36 preferably rotates the photoconductor drums 36 of the EP engines 12p and 12s at the same rotational rates that are synchronized with the line speed of the belt 24 and/or with any intermediary transfer drums or belts. This allows the system 10 to develop and transfer the layers 22p and 22s in coordination with each other from separate developer images. In particular, as shown, each part layer 22p may be transferred to the belt 24 with proper registration with each support layer 22s to produce a combined part and support material layer, which is generally designated as layer 22. As can be appreciated, some of the layers 22 transferred to the layer transfusion assembly 20 may only include support material 66s or may only include part material 66p, depending on the particular support structure and 3D part geometries and layer slicing.

In an alternative embodiment, the part layers 22p and the support layers 22s may optionally be developed and transferred along the belt 24 separately, such as with alternating layers 22p and 22s. These successive, alternating layers 22p and 22s may then be transferred to layer transfusion assembly 20, where they may be transfused separately to print or build the 3D part 26 and support structure.

Figure 3:
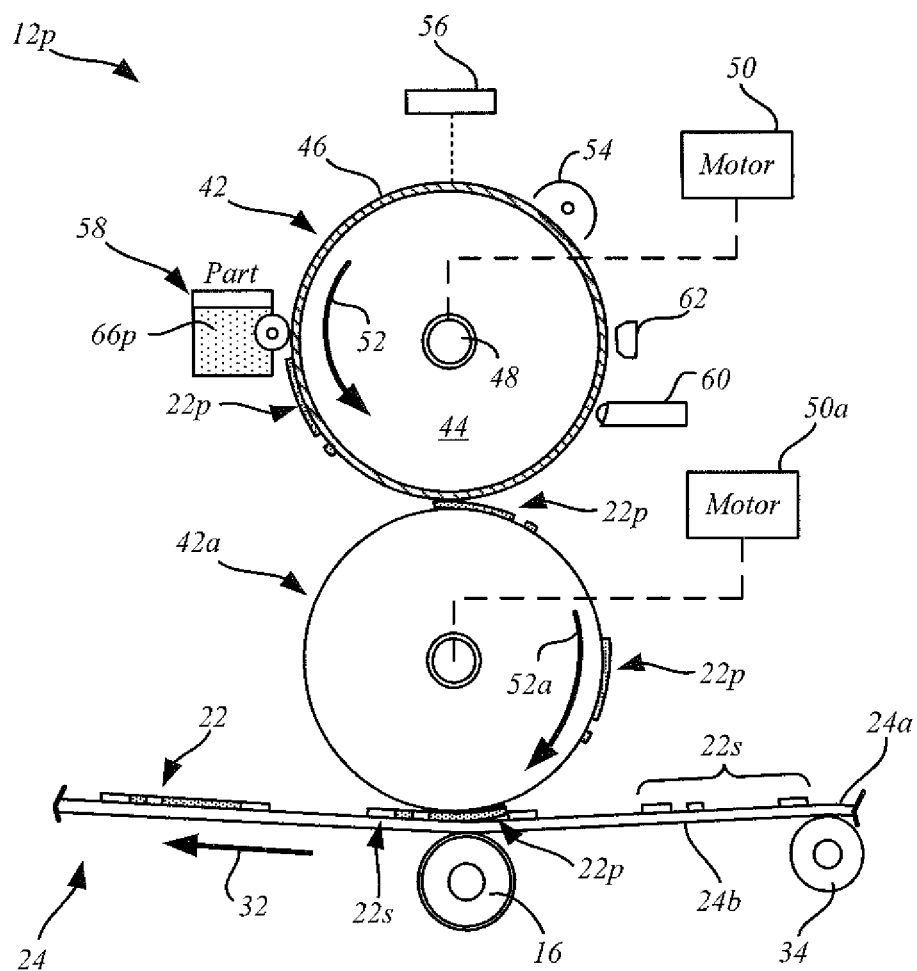
FIG. 3 is a schematic front view of an exemplary electrophotography engine, which includes an intermediary drum or belt.

In a further alternative embodiment, one or both of the EP engines 12p and 12s may also include one or more intermediary transfer drums and/or belts between the photoconductor drum 42 and the belt or transfer medium 24. For example, as shown in FIG. 3, the EP engine 12p may also include an intermediary drum 42a that rotates in the direction 52a that opposes the direction 52, in which drum 42 is rotated, under the rotational power of motor 50a. The intermediary drum 42a engages with the photoconductor drum 42 to receive the developed layers 22p from the photoconductor drum 42, and then carries the received developed layers 22p and transfers them to the belt 24.

The EP engine 12s may include the same arrangement of an intermediary drum 42a for carrying the developed layers 22s from the photoconductor drum 42 to the belt 24. The use of such intermediary transfer drums or belts for the EP engines 12p and 12s can be beneficial for thermally isolating the photoconductor drum 42 from the belt 24, if desired.

Figure 4:
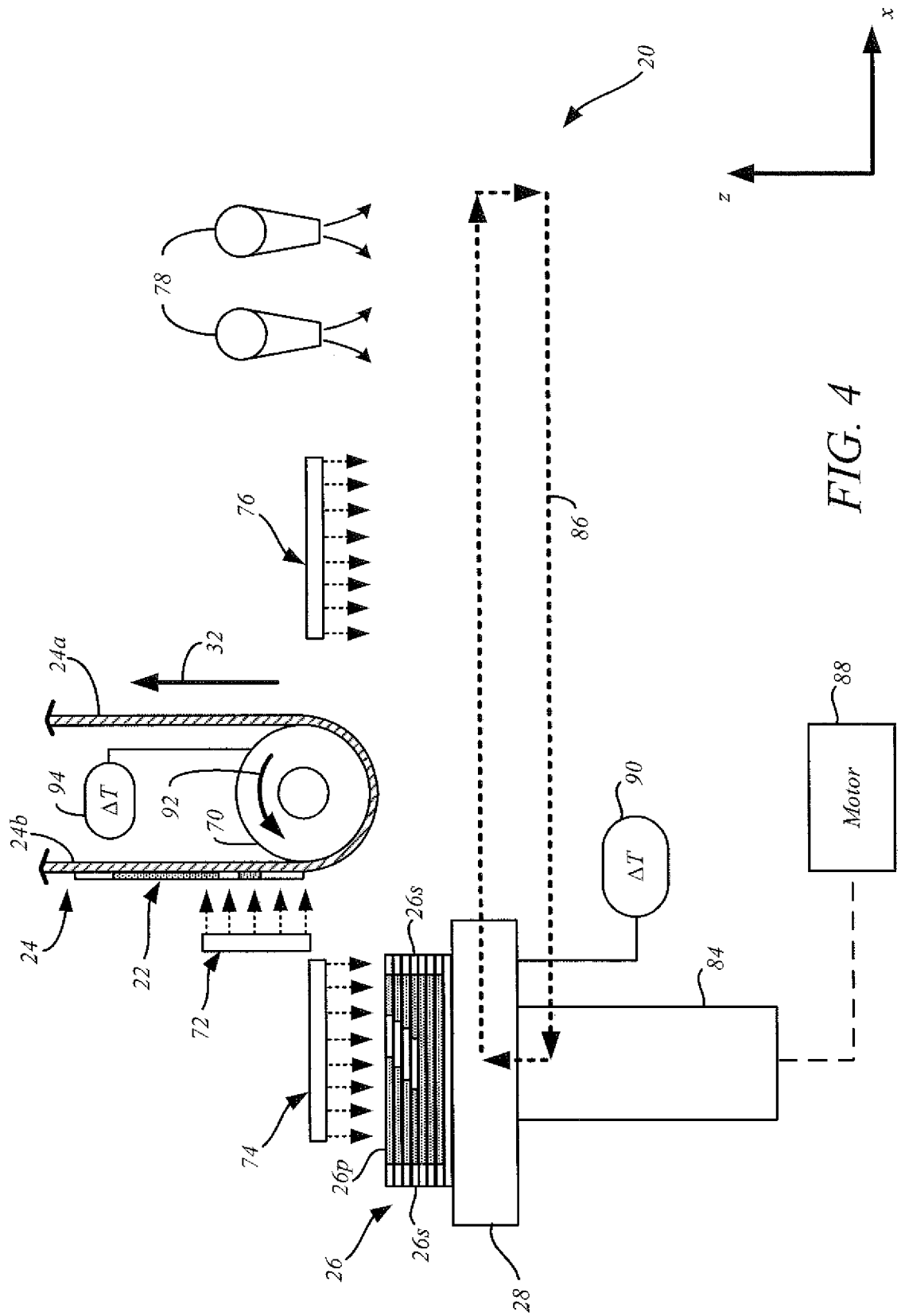
FIG. 4 is a schematic front view of an exemplary transfusion assembly of the system for performing layer transfusion steps with the developed layers.

FIG. 4 illustrates an exemplary embodiment for the layer transfusion assembly 20. As shown, the transfusion assembly 20 includes the build platform 28, a nip roller 70, pre-transfusion heaters 72 and 74, an optional post-transfusion heater 76, and air jets 78 (or other cooling units). The build platform 28 is a platform assembly or platen of system 10 that is configured to receive the heated combined layers 22 (or separate layers 22p and 22s) for printing the part 26, which includes a 3D part 26p formed of the part layers 22p, and support structure 26s formed of the support layers 22s, in a layer-by-layer manner. In some embodiments, the build platform 28 may include removable film substrates (not shown) for receiving the printed layers 22, where the removable film substrates may be restrained against build platform using any suitable technique (e.g., vacuum drawing).

The build platform 28 is supported by a gantry 84 or other suitable mechanism, which is configured to move the build platform 28 along the z-axis and the x-axis, as illustrated schematically in FIG. 1. In some embodiments, the gantry 84 may produce a reciprocating rectangular pattern where the primary motion is back-and-forth along the x-axis, as illustrated by broken lines 86 in FIG. 4. The gantry 84 may be operated by a motor 88 based on commands from the controller 36, where the motor 88 may be an electrical motor, a hydraulic system, a pneumatic system, or the like.

In the shown embodiment, the build platform 28 is heatable with heating element 90 (e.g., an electric heater). The heating element 90 is configured to heat and maintain the build platform 28 at an elevated temperature that is greater than room temperature (25° C.), such as at a desired average part temperature of 3D part 26p and/or support structure 26s, as discussed in Comb et al., U.S. Patent Application Nos. 2013/0186549 and 2013/0186558. This allows the build platform 28 to assist in maintaining 3D part 26p and/or support structure 26s at this average part temperature.

The nip roller 70 is an exemplary heatable element or heatable layer transfusion element, which is configured to rotate around a fixed axis with the movement of the belt 24. In particular, the nip roller 70 may roll against the rear surface 22s in the direction of arrow 92 while the belt 24 rotates in the feed direction 32. In the shown embodiment, the nip roller 70 is heatable with a heating element 94 (e.g., an electric heater). The heating element 94 is configured to heat and maintain nip roller 70 at an elevated temperature that is greater than room temperature (25° C.), such as at a desired transfer temperature for the layers 22.

The pre-transfusion heater 72 includes one or more heating devices (e.g., an infrared heater and/or a heated air jet) that are configured to heat the layers 22 on the belt 24 to a temperature near an intended transfer temperature of the layer 22, such as at least a fusion temperature of the part material 66p and the support material 66s, prior to reaching nip roller 70. Each layer 22 desirably passes by (or through)

the heater 72 for a sufficient residence time to heat the layer 22 to the intended transfer temperature. The pre-transfusion heater 74 may function in the same manner as the heater 72, and heats the top surfaces of the 3D part 26p and support structure 26s on the build platform 28 to an elevated temperature, such as at the same transfer temperature as the heated layers 22 (or other suitable elevated temperature).

As mentioned above, the support material 66s of the present disclosure used to form the support layers 22s and the support structure 26s, preferably has a melt rheology that is similar to or substantially the same as the melt rheology of the part material 66p of the present disclosure used to form the part layers 22p and the 3D part 26p. This allows the part and support materials 66p and 66s of the layers 22p and 22s to be heated together with the heater 72 to substantially the same transfer temperature, and also allows the part and support materials 66p and 66s at the top surfaces of the 3D part 26p and support structure 26s to be heated together with heater 74 to substantially the same temperature. Thus, the part layers 22p and the support layers 22s may be transfused together to the top surfaces of the 3D part 26p and the support structure 26s in a single transfusion step as the combined layer 22.

Optional post-transfusion heater 76 is located downstream from nip roller 70 and upstream from air jets 78, and is configured to heat the transfused layers 22 to an elevated temperature. Again, the close melt rheologies of the part and support materials 66p and 66s allow the post-transfusion heater 76 to post-heat the top surfaces of 3D part 26p and support structure 26s together in a single post-fuse step.

As mentioned above, in some embodiments, prior to building the part 26 on the build platform 28, the build platform 28 and the nip roller 70 may be heated to their desired temperatures. For example, the build platform 28 may be heated to the average part temperature of 3D part 26p and support structure 26s (due to the close melt rheologies of the part and support materials). In comparison, the nip roller 70 may be heated to a desired transfer temperature for the layers 22 (also due to the close melt rheologies of the part and support materials).

During the printing or transferring operation, the belt 24 carries a layer 22 past the heater 72, which may heat the layer 22 and the associated region of the belt 24 to the transfer temperature. Suitable transfer temperatures for the part and support materials 66p and 66s of the present disclosure include temperatures that exceed the glass transition temperature of the part and support materials 66p and 66s, where the layer 22 is softened but not melted.

As further shown in FIG. 4, during operation, the gantry 84 may move the build platform 28 (with 3D part 26p and support structure 26s) in a reciprocating rectangular pattern 86. In particular, the gantry 84 may move the build platform 28 along the x-axis below, along, or through the heater 74. The heater 74 heats the top surfaces of 3D part 26p and support structure 26s to an elevated temperature, such as the transfer temperatures of the part and support materials. As discussed in Comb et al., U.S. Patent Application Nos. 2013/0186549 and 2013/0186558, the heaters 72 and 74 may heat the layers 22 and the top surfaces of 3D part 26p and support structure 26s to about the same temperatures to provide a consistent transfusion interface temperature. Alternatively, the heaters 72 and 74 may heat layers 22 and the top surfaces of 3D part 26p and support structure 26s to different temperatures to attain a desired transfusion interface temperature.

The continued rotation of the belt 24 and the movement of the build platform 28 align the heated layer 22 with the heated top surfaces of 3D part 26p and support structure 26s with proper registration along the x-axis. The gantry 84 may continue to move the build platform 28 along the x-axis, at a rate that is synchronized with the rotational rate of the belt 24 in the feed direction 32 (i.e., the same directions and speed). This causes the rear surface 24b of the belt 24 to rotate around the nip roller 70 to nip the belt 24 and the heated layer 22 against the top surfaces of 3D part 26p and support structure 26s. This presses the heated layer 22 between the heated top surfaces of 3D part 26p and support structure 26s at the location of the nip roller 70, which at least partially transfuses the heated layer 22 to the top layers of 3D part 26p and support structure 26s.

As the transfused layer 22 passes the nip of the nip roller 70, the belt 24 wraps around the nip roller 70 to separate and disengage from the build platform 28. This assists in releasing the transfused layer 22 from the belt 24, allowing the transfused layer 22 to remain adhered to 3D part 26p and support structure 26s. Maintaining the transfusion interface temperature at a transfer temperature that is higher than its glass transition temperature, but lower than its fusion temperature, allows the heated layer 22 to be hot enough to adhere to the 3D part 26p and support structure 26s, while also being cool enough to readily release from the belt 24. Additionally, as discussed above, the close melt rheologies of the part and support materials allow them to be transfused in the same step.

After release, the gantry 84 continues to move the build platform 28 along the x-axis to the post-transfusion heater 76. At post-transfusion heater 76, the top-most layers of 3D part 26p and the support structure 26s (including the transfused layer 22) may then be heated to at least the fusion temperature of the thermoplastic-based powder in a post-fuse or heat-setting step. This melts the material of the transfused layer 22 to a highly fusable state such that polymer molecules of the transfused layer 22 quickly interdiffuse to achieve a high level of interfacial entanglement with 3D part 26p and support structure 26s.

Additionally, as the gantry 84 continues to move the build platform 28 along the x-axis past the post-transfusion heater 76 to the air jets 78, the air jets 78 blow cooling air towards the top layers of 3D part 26p and support structure 26s. This actively cools the transfused layer 22 down to the average part temperature, as discussed in Comb et al., U.S. Patent Application Nos. 2013/0186549 and 2013/0186558.

To assist in keeping the 3D part 26p and support structure 26s at the average part temperature, in some preferred embodiments, the heater 74 and/or the heater 76 may operate to heat only the top-most layers of 3D part 26p and support structure 26s. For example, in embodiments in which heaters 72, 74, and 76 are configured to emit infrared radiation, the 3D part 26p and support structure 26s may include heat absorbers and/or other colorants configured to restrict penetration of the infrared wavelengths to within the top-most layers. Alternatively, the heaters 72, 74, and 76 may be configured to blow heated air across the top surfaces of 3D part 26p and support structure 26s. In either case, limiting the thermal penetration into 3D part 26p and support structure 26s allows the top-most layers to be sufficiently transfused, while also reducing the amount of cooling required to keep 3D part 26p and support structure 26s at the average part temperature.

The gantry 84 may then actuate the build platform 28 downward, and move the build platform 28 back along the x-axis to a starting position along the x-axis, following the reciprocating rectangular pattern 86. The build platform 28 desirably reaches the starting position for proper registration with the next layer 22. In some embodiments, the gantry 84 may also actuate the build platform 28 and 3D part 26p/support structure 26s upward for proper registration with the next layer 22. The same process may then be repeated for each remaining layer 22 of 3D part 26p and support structure 26s.

As discussed above, the moisture content within the powder-based material 66, such as the part material 66p, the support material 66s, or other materials used to form the layers 22, is beneficial in the electrophotographic printing process, during which the layers 22 are developed and transferred to the transfer medium 24. However, the moisture in the layers 22 can adversely affect the transfusion process by deforming and/or creating defects in the layers 22, resulting in deformities and other defects in the 3D part 26p and the support structure 26s. Moisture in the layers 22 can also deform the layers 22 during the pre-heating stages of the transfusion process as the layers 22 are heated to at least the fusing temperature of the powder-based material 66, which is about 270° C. for conventional ABS materials 66, using the pre-transfusion heaters 72 and 74. However, transfusion temperatures and pressures will vary based upon the materials used to build the part 26. Embodiments of the present disclosure operate to reduce the moisture in the powder-based material 66 before the transfusion process to reduce potential moisture-causing defects in the layers 22.

In some embodiments, the system 10 includes a dryer 96 that heats the layers 22 on the transfer medium 24 to dry the layers 22 before the transfusion process begins, as shown in FIG. 1. In some embodiments, the dryer 96 is positioned downstream from the EP engines 12 and upstream from the transfusion assembly 20 relative to the feed direction 32. The dryer 96 is also positioned upstream from the heater 72 relative to the feed direction 32. In some embodiments, a heated air jet dryer 96 is utilized where the heated air jet impinges against a side of the belt that does not carry the toner. Therefore, the heat from the air jet dryer 96 passes through the belt to dry the imaged layers.

In some embodiments, the dryer 96 is configured to reduce the water content of the powder-based material 66 forming the layers 22, such as part material 66p forming the layer 22p and the support material 66s forming the layer 22s, to less than about 0.1% by weight. In some embodiments, the dryer 96 reduces the water content of the layers 22 on the transfer medium 24 to less than about 0.07% by weight. In some embodiments, the dryer 96 reduces the water content of the layers 22 from a beginning water content of greater than about 0.4% by weight to less than about 0.1% by weight or about 0.07% by weight.

In some embodiments, the dryer 96 includes a heater for drying the layers 22. In some embodiments, the dryer 96 includes an electric heater including a resistive heating element. In some embodiments, the dryer 96 includes a radiant heater that applies radiant heat to dry the layers 22. In some embodiments, the heater of the dryer 96 includes a hot air blower that blows hot air over the layers 22 to dry the layers 22. In some embodiments, the dryer 96 includes an infrared radiation heater that emits infrared radiation to dry the layers 22.

In some embodiments, the drying process performed by the dryer 96 operates to heat the layers 22 without fully fusing the powder-based material 66 of the layers 22 to itself. In some embodiments, the heating of the layers 22 by the dryer 96 does not cause the powder-based material 66 of each layer 22 to fully Frenkel fuse together, meaning the particles of the powder-based material 66 become tacky but do not fully coalesce together. Thus, it is acceptable for this heating of the layers 22 to cause the powder-based material 66 to bond together on the transfer medium 24. In some embodiment, the heating of the layers 22 by the dryer 96 does not cause the layers 22 to bond to the transfer medium surface 24a.

In some embodiments, this heating of the transfer layers 22 by the dryer 96 involves heating the layers 22 to a temperature that is below the fusing temperature of the powder-based material 66 forming the layers, which is dependent upon the materials (e.g., 66p and/or 66s) forming the layers 22. For example, for layers 22 that are formed using ABS, the dryer 96 heats the layers 22 to about 150° C. to about 175° C. to reduce the water content in the layers 22 having an average thickness of about 0.5 mils to about 3.5 mils. More particularly the dryer hears the layers 22 to about 160° C. at a thickness of about 2 mils. Thus, the dryer 96 heats the layers 22 to a lower temperature than the temperature the layers 22 are heated to using the heaters 72 and 74.

In some embodiments, the dryer 96 applies heat to the layers 22 over a longer period of time than the heater 72, to ensure that the layers 22 are sufficiently dried before the transfusion process begins. In some embodiments, heat is applied by the dryer 96 over a longer length of the transfer medium 24 than the heat applied by the heater 72.

The drying of the layers 22 using the dryer 96 before the start of the transfusion process reduces the likelihood of the formation of defects and strains in the layers 22 during the transfusion process and, therefore, defects in the 3D part 26p and support structures 26s. Accordingly, the 3D part 26 may be formed more accurately than would be possible without the dryer 96 or without performing the drying step of the present disclosure.

After the transfusion operation is completed, the resulting 3D part 26p and support structure 26s may be removed from system 10 and undergo one or more post-printing operations. For example, support structure 26s may be sacrificially removed from 3D part 26p using an aqueous-based solution, such as an aqueous alkali solution. Under this technique, support structure 26s may at least partially dissolve in the solution, separating it from 3D part 26p in a hands-free manner.

In comparison, part materials are chemically resistant to aqueous alkali solutions. This allows the use of an aqueous alkali solution to be employed for removing the sacrificial support structure 26s without degrading the shape or quality of 3D part 26p. Examples of suitable systems and techniques for removing support structure 26s in this manner include those disclosed in Swanson et al., U.S. Pat. No. 8,459,280; Hopkins et al., U.S. Pat. No. 8,246,888; and Dunn et al., U.S. Publication No. 2011/0186081; each of which are incorporated by reference to the extent that they do not conflict with the present disclosure.

Furthermore, after support structure 26s is removed, 3D part 26p may undergo one or more additional post-printing processes, such as surface treatment processes. Examples of suitable surface treatment processes include those disclosed in Priedeman et al., U.S. Pat. No. 8,123,999; and in Zinniel, U.S. Publication No. 2008/0169585.

Although the present disclosure has been described with reference to preferred embodiments, workers skilled in the art will recognize that changes may be made in form and detail without departing from the spirit and scope of the disclosure.

What is claimed is:

1. A method of producing a 3D part using an electrophotography-based additive manufacturing system comprising:

developing a plurality of layers of a powder-based material using at least one electrophotography (EP) engine;
transferring the developed layers to a transfer medium;
drying the layers on the transfer medium comprising heating the layers without fully fusing the powder-based material to itself using a dryer, thereby reducing water content of the layers;
heating each of the dried layers on the transfer medium to at least a fusion temperature, at which the power-based material fuses together, using a first pre-transfusion heater; and
subsequently transfusing the dried layers together on a build platform using a transfusion assembly to build the part in a layer-by-layer manner;
wherein reducing a water content of the layers comprises reducing the water content of the layers to less than about 0.1% by weight using the dryer.

2. The method according to claim 1, wherein heating the layers comprises a heating step selected from the group consisting of radiating heat to the printed layers, blowing hot air over the printed layers, and emitting infrared radiation over the printed layers.

3. The method according to claim 1, wherein heating the layers without fully fusing the powder-based material to itself comprises heating the layers without fully Frenkel fusing the powder-based material to itself.

4. The method according to claim 1, wherein reducing a water content of the layers comprises reducing the water content of the layers to less than about 0.1% by weight using the dryer.

5. The method according to claim 1, wherein reducing a water content of the layers comprises reducing the water content of the layers to less than about 0.07% by weight using the dryer.

6. The method according to claim 4, wherein reducing a water content of the layers comprises reducing the water content of the layers from greater than about 0.4% water by weight to less than about 0.1% by weight using the dryer.

7. The method according to claim 4, wherein reducing the water content of the layers comprises heating the layers without bonding the printed layers to the transfer medium.

8. The method according to claim 4, wherein heating the layers comprises heating the layers on the transfer medium to a temperature in a range of about 150° C. to about 175° C. when the layers are formed of ABS.

9. The method according to claim 4, wherein transfusing the dried layers comprises processing each of the dried layers using a transfusion assembly including pressing each of the dried layers against a previously transfused dried layer supported on the build platform.

10. The method according to claim 4, further comprising heating a top surface of a layer supported on the build platform using a second pre-transfusion heater before transfusing the dried layers together.

11. The method according to claim 1, wherein developing a plurality of the layers comprises developing layers of the powder-based material using the at least one EP engine selected from the group consisting of part layers, and support structure layers.

12. The method according to claim 11, wherein transferring the developed layers to a transfer medium comprises electrostatically attracting the developed layers to the transfer medium.

* * * * *